(12) United States Patent
Xu et al.

(10) Patent No.: US 11,774,380 B1
(45) Date of Patent: Oct. 3, 2023

(54) DIFFRACTION ANALYSIS DEVICE AND METHOD FOR FULL-FIELD X-RAY FLUORESCENCE IMAGING ANALYSIS

(71) Applicant: SICHUAN UNIVERSITY, Chengdu (CN)

(72) Inventors: Yuanjun Xu, Chengdu (CN); Ze He, Chengdu (CN); Peng Wang, Chengdu (CN); Ning Huang, Chengdu (CN); Zhu An, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 18/107,026

(22) Filed: Feb. 8, 2023

(30) Foreign Application Priority Data

Jun. 8, 2022 (CN) .......................... 202210639893.9

(51) Int. Cl.
*G01N 23/20008* (2018.01)
*G01N 23/207* (2018.01)
(Continued)

(52) U.S. Cl.
CPC ....... *G01N 23/2206* (2013.01); *G01N 23/207* (2013.01); *G01N 23/20008* (2013.01); *G01N 23/223* (2013.01); *G01N 2223/045* (2013.01); *G01N 2223/056* (2013.01); *G01N 2223/076* (2013.01); *G01N 2223/1016* (2013.01);
(Continued)

(58) Field of Classification Search
None
See application file for complete search history.

(56) References Cited

U.S. PATENT DOCUMENTS

| 6,665,372 B2 * | 12/2003 | Bahr | ...................... G01N 23/20 378/71 |
| 6,798,863 B2 * | 9/2004 | Sato | ...................... H01J 35/112 378/90 |

(Continued)

FOREIGN PATENT DOCUMENTS

| CN | 108744315 A | 11/2018 |
| CN | 213903369 U | 8/2021 |

(Continued)

*Primary Examiner* — Thomas R Artman
(74) *Attorney, Agent, or Firm* — Bayramoglu Law Offices LLC

(57) ABSTRACT

A diffraction analysis device and a method for a full-field X-ray fluorescence imaging analysis are disclosed. The device includes a switching assembly, collimation assemblies, an X-ray source, an X-ray detector, a laser indicator, and a computer control system. The switching assembly combines with the collimation assemblies to achieve a functional effect that is previously achieved by two different types of devices through only one device by changing the positioning layout of the X-ray source and the X-ray detector. The full-field X-ray fluorescence imaging analysis can be realized, and the crystal phase composition information and the element distribution imaging information of the sample can be quickly obtained through the same device without scanning, which not only greatly improves the utilization rate of each assembly in the device, reduces the assemblies cost of the device, makes the device structure more compact, but also greatly improves the analysis efficiency and detection accuracy.

16 Claims, 3 Drawing Sheets

(51) Int. Cl.
*G01N 23/2206* (2018.01)
*G01N 23/223* (2006.01)

(52) U.S. Cl.
CPC . *G01N 2223/301* (2013.01); *G01N 2223/306* (2013.01); *G01N 2223/316* (2013.01); *G01N 2223/321* (2013.01); *G01N 2223/323* (2013.01); *G01N 2223/3303* (2013.01); *G01N 2223/402* (2013.01); *G01N 2223/605* (2013.01)

(56) References Cited

U.S. PATENT DOCUMENTS

| | | | | |
|---|---|---|---|---|
| 7,023,954 B2* | 4/2006 | Rafaeli | ................ | G01N 23/22 378/50 |
| 7,796,726 B1* | 9/2010 | Gendreau | ............. | G01N 23/20 378/80 |
| 9,031,187 B2* | 5/2015 | Yellepeddi | ........... | G01N 23/223 378/81 |
| 10,094,790 B2* | 10/2018 | Hammerschmid | ......................... | G01N 23/20016 |
| 11,105,756 B2* | 8/2021 | Xiang | ................. | G01N 23/087 |
| 11,467,103 B2* | 10/2022 | Soejima | ............. | G01N 23/2209 |
| 2002/0191747 A1* | 12/2002 | Sato | .................... | G01N 23/223 378/143 |
| 2003/0043965 A1* | 3/2003 | Bahr | ..................... | G01N 23/20 378/70 |
| 2005/0069090 A1* | 3/2005 | Rafaeli | ................. | G01N 23/22 378/205 |
| 2011/0007869 A1* | 1/2011 | Gendreau | ............. | G01N 23/20 378/46 |
| 2012/0294418 A1* | 11/2012 | Yellepeddi | ........... | G01N 23/207 378/44 |
| 2017/0356862 A1* | 12/2017 | Hammerschmid | ........................ | G01N 23/2209 |
| 2020/0158667 A1* | 5/2020 | Xiang | ................ | G01N 23/2055 |
| 2022/0003691 A1* | 1/2022 | Soejima | ................ | G01N 23/223 |

FOREIGN PATENT DOCUMENTS

| | | | | |
|---|---|---|---|---|
| CN | 114577727 A | | 6/2022 | |
| CN | 114720496 B | * | 8/2022 | |
| EP | 0044492 A2 | * | 1/1982 | ........... G01N 23/207 |
| EP | 3553509 A1 | * | 10/2019 | ....... G01N 23/20008 |
| JP | 2010048668 A | * | 3/2010 | ............. G01N 23/22 |

* cited by examiner

DIFFRACTION ANALYSIS DEVICE AND METHOD FOR FULL-FIELD X-RAY FLUORESCENCE IMAGING ANALYSIS

CROSS REFERENCE TO THE RELATED APPLICATIONS

This application is based upon and claims priority to Chinese Patent Application No. 202210639893.9 filed on Jun. 8, 2022, the entire contents of which are incorporated herein by reference.

TECHNICAL FIELD

The present invention belongs to the technical field of material analysis, particularly a diffraction analysis device and a method for a full-field X-ray fluorescence imaging analysis.

BACKGROUND

With the growth of related research in archaeology, geology, mineralogy, material science, biology, and cultural relic conservation, researchers are eager to quickly and accurately obtain the element distribution imaging, crystal structure, and other information of the studied samples. It is helpful for researchers to understand these research objects better and explore the inherent properties of the sample materials from a micro and macro point of view. And, the development of science and technology and the progress of human civilization can be continuously promoted. Therefore, it is an important research direction to use one device to achieve the function that is previously achieved by two different types of devices.

As we all know, the element information of the sample reveals the types of elements contained in the sample, and the phase information of the sample reveals the phase structure composed of different elements. The combination of these two kinds of information can help researchers to understand the internal properties of the sample better, while the element distribution imaging information reveals not only the type of elements but also the content of each element and its distribution on the surface of the sample. Combining the element distribution imaging information and the phase information analysis will further deepen the understanding of the studied samples. In the process of specific sample characterization, researchers are eager to quickly and accurately obtain the element distribution imaging information and the phase information, but using the traditional scanning distribution imaging analysis device to obtain the element distribution imaging information is very troublesome and time-consuming. Although the latest full-field X-ray fluorescence imaging analysis device takes a short time, only the element distribution imaging information is not enough to realize the complete characterization of the sample. It is also necessary to use another diffraction analysis device to obtain the phase information of the sample. However, using two different types of analysis devices to study the samples will increase the cost of purchasing and maintaining the equipment and greatly reduce the analysis efficiency and accuracy. At the same time, for some special samples prohibited from sampling and transportation, carrying two different analysis devices to the site for in-situ analysis will also become very troublesome and inconvenient. Therefore, it is necessary to propose a diffraction analysis device to realize the full-field X-ray fluorescence imaging analysis to cure the deficiency that the full-field X-ray fluorescence imaging analysis and the diffraction analysis cannot be implemented through a single device to overcome the shortcomings of the prior analysis device, such as single analysis function, low analysis efficiency, high cost of analysis device, the inability of efficient complementary analysis, low analysis accuracy, and so on.

SUMMARY

To overcome the above shortcomings, the inventors of the present invention continuously reform and innovate through long-term, in-depth research and many experiments and efforts and propose a diffraction analysis device for a full-field X-ray fluorescence imaging analysis to overcome the shortcomings of the prior analysis device, such as single analysis function, low analysis efficiency, high cost of analysis device, the inability of efficient complementary analysis, and low analysis accuracy. The present invention has the characteristics of intelligence, speediness, compact structure, and real-time analysis for greatly improving the efficiency and accuracy of sample analysis.

The technical solution adopted by the present invention to achieve the above purpose is as follows:

A diffraction analysis device for a full-field X-ray fluorescence imaging analysis includes a layout switching assembly, multipurpose collimation assemblies, an X-ray source, an X-ray detector, a laser indicator, and a computer control system.

The layout switching assembly is provided with the X-ray source and the X-ray detector and is configured to change the positioning layout of the X-ray source and the X-ray detector.

The multipurpose collimation assemblies are arranged between the X-ray source and the surface of a sample and between the X-ray detector and the surface of the sample. The multipurpose collimation assemblies are configured to collimate an incident X-ray beam and change the spot size of the X-ray beam irradiated on the surface of the sample to realize the acquisition of element distribution imaging information.

The laser indicator is configured to indicate the position of an analysis point or a center point of an analysis area on the surface of the sample, and each of the assemblies is electrically connected through the computer control system.

Further, the layout switching assembly includes a moving control actuator, a moving track, and a position holder. The moving control actuator drives the X-ray source and the X-ray detector to move along the moving track to specified positions, and the position holder is configured to limit the moving positions of the X-ray source and the X-ray detector.

Further, the moving control actuator includes a driving module and a motor, and the driving module drives the motor to drive the X-ray source and the X-ray detector to move along the moving track.

Further, the multipurpose collimation assemblies include a front-end combined collimator and a rear-end combined collimator. The front-end combined collimator is located between the X-ray source and the surface of the sample. The rear-end combined collimator is located between the X-ray detector and the surface of the sample during the full-field X-ray fluorescence imaging analysis.

Further, the front-end combined collimator includes a first collimator, a second collimator, and a high-precision aperture adjuster located between the first collimator and the second collimator. The front-end combined collimator is configured to collimate the incident X-ray beam and change the spot size of the X-ray beam irradiated on the surface of the sample.

Further, during the X-ray diffraction analysis, the first collimator is located between the X-ray source and the surface of the sample and configured to collimate the incident X-ray beam. During the full-field X-ray fluorescence imaging analysis, the second collimator is located between the X-ray source and the surface of the sample and configured to collimate the incident X-ray beam.

Further, the high-precision aperture adjuster includes a micro-precision ball screw, a stepping motor, and a driver. The stepping motor drives the micro-precision ball screw to adjust the first collimator and the second collimator.

Further, the rear-end combined collimator includes a pinhole collimator, a parallel multihole collimator, and a collimating switcher and is configured to acquire the element distribution imaging information in conjunction with the X-ray detector. The pinhole collimator is located in the direct middle between the surface of the sample and the X-ray detector. The parallel multihole collimator is located between the surface of the sample and the X-ray detector. Switching between the pinhole collimator and the parallel multihole collimator is realized by the collimating switcher. The collimating switcher includes a circular belt sleeved on guide wheels, and pick sets are arranged at both ends of the circular belt. The pinhole collimator and the parallel multihole collimator are connected to the circular belt, such that the circular belt is driven by picking the pick sets to drive the pinhole collimator and the parallel multihole collimator to move.

Further, the aperture size range of the pinhole collimator is 0.1 mm-2 mm, and the material is one of tungsten or lead; the aperture size range of the parallel multihole collimator is 0.5 mm-4 mm, and the material is one of tungsten or lead.

The present invention also provides a method for a full-field X-ray fluorescence imaging analysis, which adopts the devices described above. The specific process is as follows:

S10: Moving a device near a sample or placing the sample on a sample platform.

For objects or large samples unmoved and prohibited from sampling, the device is moved near the objects or the samples. For small samples available for movement or objects available for sampling, the samples or the objects are placed on the sample platform.

S20: Selecting a sample analysis point or an analysis area.

The sample analysis point or a center point of the analysis area is positioned and selected using the laser indicator.

S30: Selecting an analysis mode.

A full-field X-ray fluorescence imaging analysis or an X-ray diffraction analysis is selected.

S40: Setting analysis parameters.

For the full-field X-ray fluorescence imaging analysis mode, parameters such as voltage and current of the X-ray source, apertures of the collimators, and analysis time are set, and the pinhole collimator or the parallel multihole collimator is selected. For the X-ray diffraction analysis mode, parameters such as the voltage and current of the X-ray source, the aperture of the first collimator, the aperture of the second collimator, and the analysis time are set.

S50: Starting an analysis.

After the parameter setting is complete, the analysis is started. During the full-field X-ray fluorescence imaging analysis, the X-ray source and the X-ray detector are automatically moved to the positions of the X-ray source and the X-ray detector to obtain the element distribution imaging information of the specified area of the surface of the sample. During the X-ray diffraction analysis, the X-ray source and the X-ray detector are automatically moved to the positions of the X-ray source and the X-ray detector to obtain the crystal phase composition information of the specified analysis point.

S60: Obtaining data.

Acquired data by the X-ray detector is transmitted to the computer control system for storage at a specified location.

S70: Analyzing the data.

The data is read from a data storage location to generate an element distribution imaging or a diffraction pattern for further analyzing data of spectrograms.

S80: Giving identification results.

Accurate identification results are given according to the analysis results of the data of the spectrograms.

In the present invention, the layout switching assembly combined with the multipurpose collimation assemblies to achieve a functional effect that is previously achieved by two different types of devices through only one device by changing the positioning layout of the X-ray source and the X-ray detector. The laser indicator is configured to indicate the position of the analysis point or the center point of the analysis area on the surface of the sample. Each of the assemblies described above is electrically connected through the computer control system. The technical solution provided by the present invention can realize the full-field X-ray fluorescence imaging analysis in an X-ray diffraction analysis device. The crystal phase composition information and the element distribution imaging information of the sample can be quickly obtained through the same device without scanning, which not only greatly improves the utilization rate of each assembly in the device, reduces the cost of assembling the device, and makes the device structure more compact, but also greatly improves the analysis efficiency and detection accuracy.

BRIEF DESCRIPTION OF THE DRAWINGS

To more clearly illustrate the technical solution of the embodiments of the present invention, the drawings required for use in the embodiments are briefly introduced below. It should be understood that the drawings below only show some embodiments of the present invention and, therefore, should not be regarded as a limitation of the scope of the invention. For those having ordinary skill in the art, other related drawings can also be obtained from these drawings without creative labor.

Figure 1:
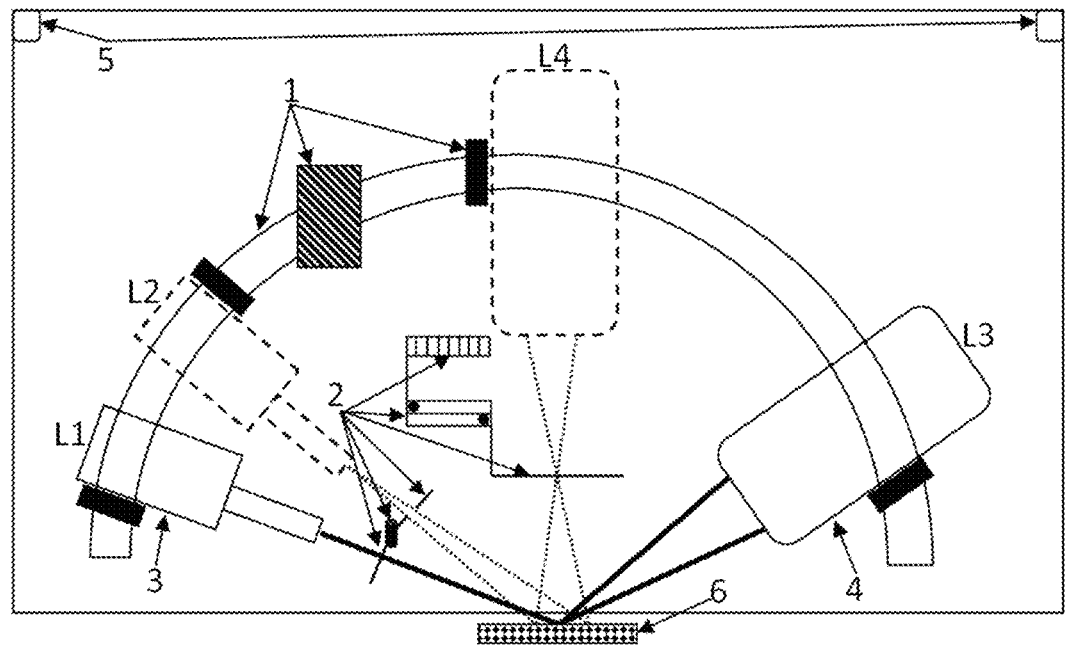
FIG. 1 is a schematic diagram showing the structure of a diffraction analysis device for full-field X-ray fluorescence imaging analysis in the present invention.

The reference numerals are in FIGS. 1-5: 1. layout switching assembly; 11. moving control actuator; 12. moving track; 13. position holder; 2. multipurpose collimation assemblies; 21. first collimator; 22. second collimator; 23. high-precision aperture adjuster; 24. pinhole collimator; 25.

parallel multihole collimator; 26. collimating switcher; 3. X-ray source; 4. X-ray detector; 5. laser indicator; 6. sample.

DETAILED DESCRIPTION OF THE EMBODIMENTS

To make the subject, technical solution, and advantages of the present invention clear, the technical solution in the embodiments of the present invention is described clearly and completely below, and it is evident that the described embodiments are part of the embodiments of the present invention, not all embodiments. Based on the embodiments in the present invention, all other embodiments obtained by those having ordinary skill in the art without creative labor are within the scope of protection of the present invention. Accordingly, the detailed description of the embodiments of the present invention provided below is not intended to limit the scope of protection of the present invention but merely represents selected embodiments of the present invention.

Embodiment

As shown in FIG. 1, the structure of a diffraction analysis device for a full-field X-ray fluorescence imaging analysis is shown. In FIG. 1, when the X-ray source 3 is at the position L1 and the X-ray detector is at the position L3, an X-ray diffraction analysis of the sample is performed. When the X-ray source 3 is at the position L2 and the X-ray detector is at the position L4, a full-field X-ray fluorescence imaging analysis of the sample is performed. The analysis device includes the layout switching assembly 1, the multipurpose collimation assemblies 2, the X-ray source 3, the X-ray detector 4, the laser indicator 5, and a computer control system. The layout switching assembly 1 is configured to change the positioning layout of the X-ray source 3 and the X-ray detector 4. The multipurpose collimation assemblies 2 are configured to collimate an incident X-ray beam, change the spot size of the X-ray beam irradiated on the surface of the sample, and for the acquisition of element distribution imaging information. When the X-ray source 3 is at the position L1 and the X-ray detector 4 is at the position L3, the X-ray diffraction analysis can be performed. When the X-ray source 3 is at the position L2, and the X-ray detector 4 is at the position L4, the full-field X-ray fluorescence imaging analysis can be performed. Combining the layout switching assembly 1 and the multipurpose collimation assemblies 2 can achieve a functional effect that is previously achieved by two different types of devices through only one device by changing the positioning layout of the X-ray source 3 and the X-ray detector 4. The laser indicator 5 is configured to indicate the position of the analysis point or the center point of the analysis area on the surface of the sample 6. Each of the assemblies described above is electrically connected through the computer control system. The above assemblies can be centrally installed on a platform or can be installed in conjunction with each other according to an actual situation, and those skilled in the art can choose a reasonable assembly relationship according to the actual situation.

Figure 2:
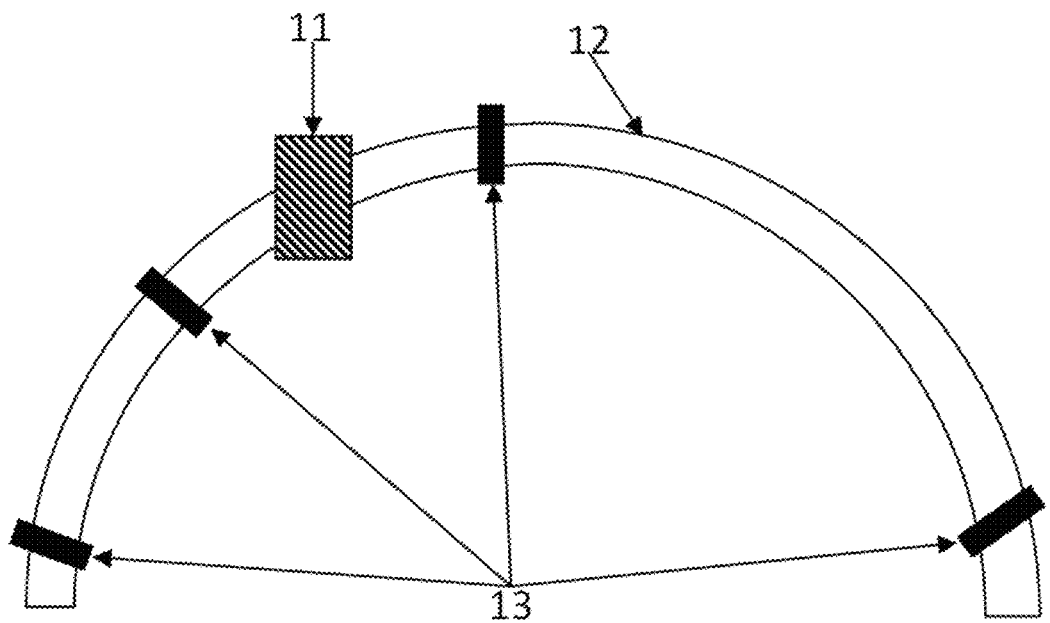
FIG. 2 is a schematic diagram showing the structure of a layout switching assembly in the present invention.

As shown in FIG. 2, the layout switching assembly 1 includes the moving control actuator 11, the moving track 12, and the position holder 13. The moving control actuator 11 drives the X-ray source 3 and the X-ray detector 4 to respectively move to the position of the X-ray source and the position of the X-ray detector (position L1 and position L3) for the X-ray diffraction analysis through the moving track 12. Or, the moving control actuator 11 drives the X-ray source 3 and the X-ray detector 4 to respectively move to the position of the X-ray source and the position of the X-ray detector (position L2 and position L4) for the full-field X-ray fluorescence imaging analysis through the moving track 12. The position holder 13 is configured to limit the moving positions of the X-ray source 3 and the X-ray detector 4. The moving control actuator 11 includes a driving module and a motor. Commands are sent to the driving module by control software to control the motor work. The driving module is one of the motor drivers and is configured to convert a control signal into a voltage or a current signal to drive the motor work. The motor is any one of the DC motor, AC motor, stepping motor, etc. The moving track 12 is one of the arc and linear tracks and is configured to guide the movement of the X-ray source 3 and an X-ray detector 4. The position holder 13 is one of the limiters and is configured to limit the position of the X-ray source 3 and the X-ray detector 4 when they move.

Figure 3:
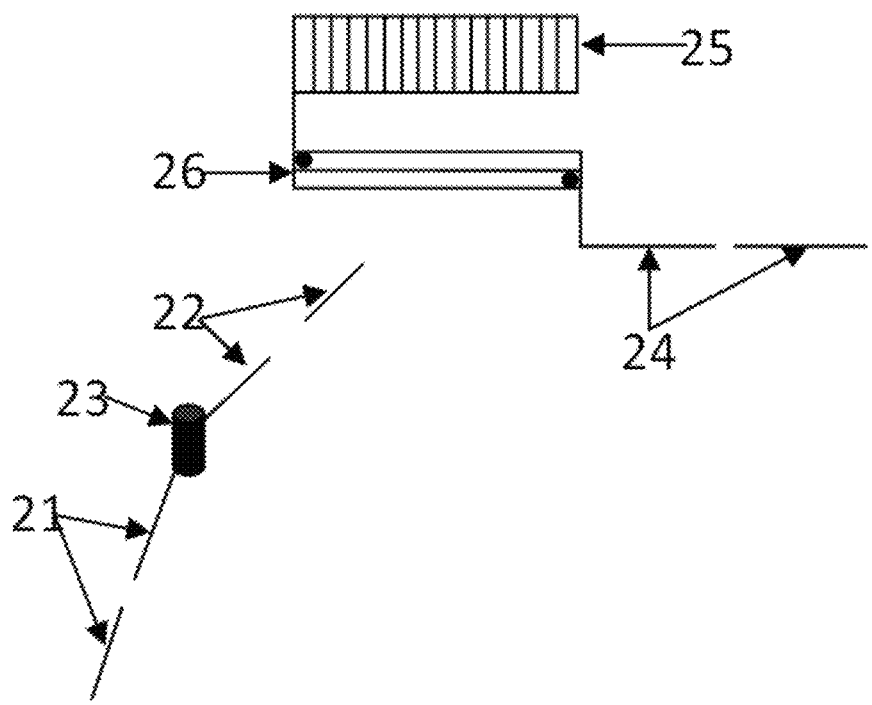
FIG. 3 is a schematic diagram showing the structures of multipurpose collimation assemblies in the present invention.

As shown in FIG. 3, the multipurpose collimation assemblies 2 include a front-end combined collimator and a rear-end combined collimator. The front-end combined collimator is located between the X-ray source 3 and the surface of the sample 6 and is configured to achieve the beam incidence angle and incident beam spot size required for the X-ray diffraction analysis and the full-field X-ray fluorescence imaging analysis. The rear-end combined collimator is located between the X-ray detector 4 and the surface of sample 6 when the full-field X-ray fluorescence imaging analysis is conducted. The rear-end combined collimator is used in conjunction with the X-ray detector 4 to realize the acquisition of the element distribution imaging information. The front-end combined collimator includes the first collimator 21, the second collimator 22, and the high-precision aperture adjuster 23 located between the first collimator 21 and the second collimator 22. The first collimator 21 and the second collimator 22 are made of tungsten or lead. The first collimator 21 is located between the X-ray source 3 corresponding to the position L1 and the surface of sample 6 and is configured for a collimator function in the X-ray diffraction analysis. The second collimator 22 is located between the X-ray source 3 corresponding to position L2 and the surface of sample 6 and is configured for the collimator function in the full-field X-ray fluorescence imaging analysis. The high-precision aperture adjuster 23 includes a micro-precision ball screw, a stepping motor, and a driver. The stepping motor is connected to the ball screw, and the first collimator 21 and the second collimator 22 are installed on the ball screw. The stepping motor is driven by the driver to drive the screw to adjust the first collimator 21 and the second collimator 22. The control software can adjust the aperture of the first collimator 21 and the second collimator 22 by controlling the high-precision aperture adjuster 23. The rear-end combined collimator includes the pinhole collimator 24, the parallel multihole collimator 25, and the collimating switcher 26. The pinhole collimator 24 is located in the direct middle between the surface of the sample and the X-ray detector 4 corresponding to the position L4. The parallel multihole collimator 25 is located between the surface of sample 6 and the X-ray detector 4 corresponding to the position L4 and near the direct front of the beryllium window of the X-ray detector 4. Switching between the pinhole collimator 24 and the parallel multihole collimator 25 can be realized by the collimating switcher 26. The aperture of the pinhole collimator 24 is any one of 0.1 mm, 0.2 mm, 0.5 mm, 1 mm, 2 mm, etc., and the aperture of the parallel multihole collimator 25 is any one of 0.5 mm, 1 mm, 2 mm, 3 mm, 4 mm, etc.

Figure 5:
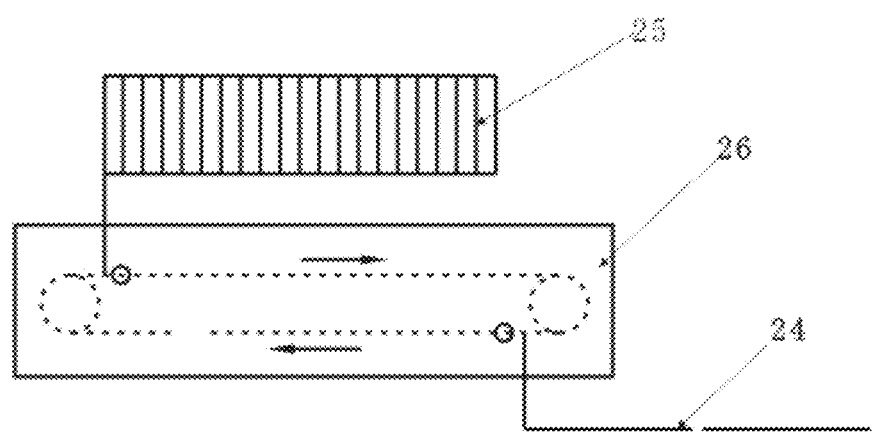
FIG. 5 is a schematic diagram showing the structure of a collimating switcher in an embodiment of the present invention.

As shown in FIGS. 3 and 5, the collimating switcher 26 is a kind of switcher for switching the positions of the pinhole collimator 24 and the parallel multihole collimator 25 and is configured to switch the pinhole collimator 24 and the parallel multihole collimator 25. A circular belt is adopted and is sleeved on two guide wheels, and pick sets are arranged at both ends of the circular belt. Then, the pinhole collimator 24 and the parallel multihole collimator 25 are connected to the circular belt, such that the circular belt is driven by picking the pick sets to drive the pinhole collimator 24 and the parallel multihole collimator 25 to move. In addition, those skilled in the art can also make improvements or adaptive adjustments according to the actual situation.

When the pick set corresponding to the pinhole collimator of the collimating switcher 26 is moved to the far right, the pinhole collimator 24 moves to the direct middle between the surface of sample 6 and the X-ray detector 4, and the parallel multihole collimator 25 moves from the direct front of the beryllium window of the X-ray detector 4 to the left of the beryllium window of the X-ray detector 4. Contrarily, when the pick set corresponding to the parallel multihole collimator of the collimating switcher 26 is moved to the far right, the parallel multihole collimator 25 moves to the direct front of the beryllium window of the X-ray detector 4, and the pinhole collimator 24 moves from the direct middle between the surface of sample 6 and the X-ray detector 4 to the left of the X-ray detector 4. In the embodiment, the X-ray source 3 is one of the X-ray tubes, and the target material is any one of the tungsten, copper, cesium, iron, cobalt, etc. The X-ray detector 4 adopts one of the two-dimensional charge-coupled device (CCD) detectors. The laser indicator 5 is a laser module pen-shaped emitter configured to indicate the position of the sample analysis point or the center point of the analysis area. The computer control system includes a laptop computer and supporting control software. The control software is installed on the laptop computer and controls the whole device to work through the corresponding data communication interface. The computer control system is not shown in FIG. 1. In this embodiment, the control system takes an ordinary laptop computer as the hardware platform, C#, C, and C++ as the programming language, and develops the control software on the Windows XP or above version system, or Linux system according to the control purpose. Complete control of the analysis device can be achieved by running the control software on the laptop running Windows XP or above version system, or Linux system. Those skilled in the art can also make adaptive adjustments to the control system according to the actual situation.

Figure 4:
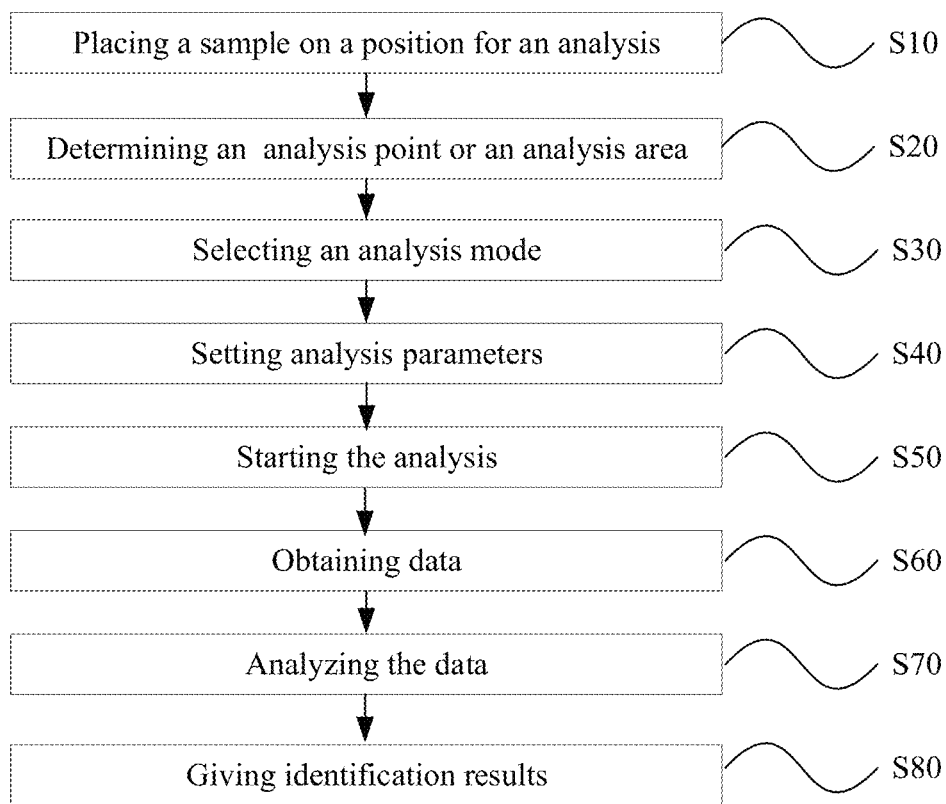
FIG. 4 is a workflow chart for full-field X-ray fluorescence imaging analysis and X-ray diffraction analysis in the present invention.

In FIG. 4, the process of the full-field X-ray fluorescence imaging analysis and the X-ray diffraction analysis for the sample of the present invention is shown. The specific operation of the sample analysis with the device of the present invention is as follows:

S10: The device is moved near the sample, or the sample is placed on the sample platform.

For objects or large samples which are unmoved and prohibited from sampling, the device is moved near the objects or the samples. For small samples available for movement or objects available for sampling, the samples or the objects can be placed on the sample platform.

S20: The sample analysis point or the analysis area is selected.

The sample analysis point or the center point of the analysis area is positioned and selected through the laser indicator.

S30: The analysis mode is selected.

The full-field X-ray fluorescence imaging analysis or the X-ray diffraction analysis is selected.

S40: Analysis parameters are set.

For the full-field X-ray fluorescence imaging analysis mode, parameters such as voltage and current of the X-ray source, apertures of collimators, and analysis time are set, and the pinhole collimator or the parallel multihole collimator are selected. For the X-ray diffraction analysis mode, parameters such as the voltage and current of the X-ray source, the aperture of the first collimator, the aperture of the second collimator, and the analysis time are set.

S50: Analysis is started

After the parameter setting is complete, the analysis is started. When the full-field X-ray fluorescence imaging analysis is performed, the X-ray source and the X-ray detector are automatically moved to the position L2 and the position L4, respectively, to obtain the element distribution imaging information of the specified area of the surface of the sample. When the X-ray diffraction analysis is performed, the X-ray source and the X-ray detector are automatically moved to the position L1 and the position L3, respectively, to obtain the crystal phase composition information of the specified analysis point.

S60: Data is obtained.

Acquired data is transmitted by the X-ray detector to the computer control system for storage at a specified location.

S70: The data is analyzed.

The data is read from the data storage location to generate the element distribution imaging or diffraction pattern for further analyzing the data of the spectrograms.

S80: Identification results are given.

Accurate identification results are given according to the analysis results of the data of the spectrograms.

Although the present invention is described in detail by referring to the embodiments, those skilled in the art can still modify the technical solution recorded in the embodiments mentioned above or equivalent replacement of some of the technical features. Any modifications, equivalent replacements, improvements, etc., made within the spirit and principles of the present invention shall be included in the scope of protection of the present invention.

What is claimed is:

1. A diffraction analysis device for a full-field X-ray fluorescence imaging analysis comprising a layout switching assembly, a plurality of multipurpose collimation assemblies, an X-ray source, an X-ray detector, a laser indicator, and a computer control system; wherein the layout switching assembly is provided with the X-ray source and the X-ray detector and is configured to change a positioning layout of the X-ray source and the X-ray detector; a switch between a full-field X-ray fluorescence imaging analysis mode and an X-ray diffraction analysis mode is realized by changing the positioning layout;

the plurality of multipurpose collimation assemblies is arranged between the X-ray source and a surface of a sample and between the X-ray detector and the surface of the sample; the plurality of multipurpose collimation assemblies is configured to collimate an incident X-ray beam and change a spot size of the incident X-ray beam irradiated on the surface of the sample to realize an acquisition of an element distribution imaging information; and the laser indicator is configured to indicate a position of an analysis point or a center point of an analysis area on the surface of the sample, and each of the plurality of multipurpose collimation assemblies is electrically connected through the computer control system, wherein the layout switching assembly comprises a moving control actuator, a moving track, and a position holder; the moving control actuator drives the X-ray source and the X-ray detector to move along the moving track to positions, and the position holder is configured to limit moving positions of the X-ray source and the X-ray detector.

2. The diffraction analysis device for the full-field X-ray fluorescence imaging analysis according to claim 1, wherein the moving control actuator comprises a driving module and a motor, and the driving module drives the motor to drive the X-ray source and the X-ray detector to move along the moving track.

3. The diffraction analysis device for the full-field X-ray fluorescence imaging analysis according to claim 1, wherein the plurality of multipurpose collimation assemblies comprises a front-end combined collimator and a rear-end combined collimator; the front-end combined collimator is located between the X-ray source and the surface of the sample; the rear-end combined collimator is located between the X-ray detector and the surface of the sample during the full-field X-ray fluorescence imaging analysis.

4. A method for a full-field X-ray fluorescence imaging analysis based on the diffraction analysis device according to claim 1, comprising:
S10: moving a device near a sample or placing the sample on a sample platform, wherein when a first object unable to be sampled or a large sample unable to move, moving the device near the first object or the large sample; and wherein when a small sample able to move or a second object able to be sampled, placing small sample or the second objects on the sample platform;
S20: selecting the analysis point or the analysis area of the sample:
positioning and selecting the analysis point or the center point of the analysis area of the sample through the laser indicator;
S30: selecting an analysis mode:
selecting the full-field X-ray fluorescence imaging analysis or an X-ray diffraction analysis;
S40: setting analysis parameters:
wherein for the full-field X-ray fluorescence imaging analysis mode, setting parameters comprising a voltage and a current of the X-ray source, an analysis time, and selecting the pinhole collimator or the parallel multihole collimator; and wherein for the X-ray diffraction analysis mode, setting parameters comprising the voltage and the current of the X-ray source, and the analysis time;
S50: starting an analysis:
starting the analysis after a parameter setting is complete; during the full-field X-ray fluorescence imaging analysis, the X-ray source and the X-ray detector are automatically moved to first positions of the X-ray source and the X-ray detector to obtain the element distribution imaging information of an area of the surface of the sample; during the X-ray diffraction analysis, the X-ray source and the X-ray detector are automatically moved to second positions of the X-ray source and the X-ray detector to obtain a crystal phase composition information of a specified analysis point;
S60: obtaining a data:
transmitting the acquired data by the X-ray detector to the computer control system for storage at a location;
S70: analyzing the data:
reading the data from a data storage location to generate an element distribution imaging or a diffraction pattern for further analyzing a data of spectrograms;
S80: giving identification results:
giving identification results according to analysis results of the data of the spectrograms.

5. The method according to claim 4, wherein in the diffraction analysis device, the moving control actuator comprises a driving module and a motor, and the driving module drives the motor to drive the X-ray source and the X-ray detector to move along the moving track.

6. The method according to claim 4, wherein in the diffraction analysis device, the plurality of multipurpose collimation assemblies comprises a front-end combined collimator and a rear-end combined collimator; the front-end combined collimator is located between the X-ray source and the surface of the sample; the rear-end combined collimator is located between the X-ray detector and the surface of the sample during the full-field X-ray fluorescence imaging analysis.

7. The method according to claim 6, wherein in the diffraction analysis device, the rear-end combined collimator comprises a pinhole collimator, a parallel multihole collimator, and a collimating switcher and is configured for the acquisition of the element distribution imaging information in conjunction with the X-ray detector; the pinhole collimator is located in a direct middle between the surface of the sample and the X-ray detector; the parallel multihole collimator is located between the surface of the sample and the X-ray detector; a switching between the pinhole collimator and the parallel multihole collimator are realized by the collimating switcher; the collimating switcher comprises a circular belt sleeved on guide wheels, and pick sets are arranged at both ends of the circular belt; the pinhole collimator and the parallel multihole collimator are connected to the circular belt, so the circular belt is driven by picking the pick sets to drive the pinhole collimator and the parallel multihole collimator to move.

8. The method according to claim 7, wherein in the diffraction analysis device, an aperture size range of the pinhole collimator is 0.1 mm-2 mm, and a material of the pinhole collimator is one of tungsten or lead; an aperture size range of the parallel multihole collimator is 0.5 mm-4 mm, and a material of the parallel multihole collimator is one of tungsten or lead.

9. The method according to claim 6, wherein in the diffraction analysis device, the front-end combined collimator comprises the first collimator, the second collimator, and a high-precision aperture adjuster located between the first collimator and the second collimator; the front-end combined collimator is configured to collimate the incident X-ray beam and change the spot size of the incident X-ray beam irradiated on the surface of the sample.

10. The method according to claim 9, wherein in the diffraction analysis device, during the X-ray diffraction analysis, the first collimator is located between the X-ray source and the surface of the sample and configured to collimate the incident X-ray beam; during the full-field X-ray fluorescence imaging analysis, the second collimator is located between the X-ray source and the surface of the sample and configured collimate the incident X-ray beam.

11. The method according to claim 9, wherein in the diffraction analysis device, the high-precision aperture adjuster comprises a micro-precision ball screw, a stepping motor, and a driver; the stepping motor drives the micro-precision ball screw to adjust the first collimator and the second collimator.

12. A diffraction analysis device for the full-field X-ray fluorescence imaging analysis comprising a layout switching assembly, a plurality of multipurpose collimation assemblies, an X-ray source, an X-ray detector, a laser indicator, and a computer control system; wherein
the layout switching assembly is provided with the X-ray source and the X-ray detector and is configured to change a positioning layout of the X-ray source and the X-ray detector; a switch between a full-field X-ray fluorescence imaging analysis mode and an X-ray diffraction analysis mode is realized by changing the positioning layout;
the plurality of multipurpose collimation assemblies is arranged between the X-ray source and a surface of a sample and between the X-ray detector and the surface of the sample; the plurality of multipurpose collimation assemblies is configured to collimate an incident X-ray beam and change a spot size of the incident X-ray beam irradiated on the surface of the sample to realize an acquisition of an element distribution imaging information; and
the laser indicator is configured to indicate a position of an analysis point or a center point of an analysis area on the surface of the sample, and each of the plurality of multipurpose collimation assemblies is electrically connected through the computer control system, wherein the plurality of multipurpose collimation assemblies comprises a front-end combined collimator and a rear-end combined collimator; the front-end combined collimator is located between the X-ray source and the surface of the sample; the rear-end combined collimator is located between the X-ray detector and the surface of the sample during the full-field X-ray fluorescence imaging analysis, and wherein the front-end combined collimator comprises a first collimator, a second collimator, and a high-precision aperture adjuster located between the first collimator and the second collimator; the front-end combined collimator is configured to collimate the incident X-ray beam and change the spot size of the incident X-ray beam irradiated on the surface of the sample.

13. The diffraction analysis device for the full-field X-ray fluorescence imaging analysis according to claim 12, wherein during an X-ray diffraction analysis, the first collimator is located between the X-ray source and the surface of the sample and configured to collimate the incident X-ray beam; during the full-field X-ray fluorescence imaging analysis, the second collimator is located between the X-ray source and the surface of the sample and configured collimate the incident X-ray beam.

14. The diffraction analysis device for the full-field X-ray fluorescence imaging analysis according to claim 12, wherein the high-precision aperture adjuster comprises a micro-precision ball screw, a stepping motor, and a driver; the stepping motor drives the micro-precision ball screw to adjust the first collimator and the second collimator.

15. The diffraction analysis device for the full-field X-ray fluorescence imaging analysis comprising a layout switching assembly, a plurality of multipurpose collimation assemblies, an X-ray source, an X-ray detector, a laser indicator, and a computer control system; wherein
the layout switching assembly is provided with the X-ray source and the X-ray detector and is configured to change a positioning layout of the X-ray source and the X-ray detector; a switch between a full-field X-ray fluorescence imaging analysis mode and an X-ray diffraction analysis mode is realized by changing the positioning layout;
the plurality of multipurpose collimation assemblies is arranged between the X-ray source and a surface of a sample and between the X-ray detector and the surface of the sample; the plurality of multipurpose collimation assemblies is configured to collimate an incident X-ray beam and change a spot size of the incident X-ray beam irradiated on the surface of the sample to realize an acquisition of an element distribution imaging information; and
the laser indicator is configured to indicate a position of an analysis point or a center point of an analysis area on the surface of the sample, and each of the plurality of multipurpose collimation assemblies is electrically connected through the computer control system, wherein the plurality of multipurpose collimation assemblies comprises a front-end combined collimator and a rear-end combined collimator; the front-end combined collimator is located between the X-ray source and the surface of the sample; the rear-end combined collimator is located between the X-ray detector and the surface of the sample during the full-field X-ray fluorescence imaging analysis, and wherein the rear-end combined collimator comprises a pinhole collimator, a parallel multihole collimator, and a collimating switcher and is configured for the acquisition of the element distribution imaging information in conjunction with the X-ray detector; the pinhole collimator is located in a direct middle between the surface of the sample and the X-ray detector; the parallel multihole collimator is located between the surface of the sample and the X-ray detector; a switching between the pinhole collimator and the parallel multihole collimator are realized by the collimating switcher; the collimating switcher comprises a circular belt sleeved on guide wheels, and pick sets are arranged at both ends of the circular belt; the pinhole collimator and the parallel multihole collimator are connected to the circular belt, so the circular belt is driven by picking the pick sets to drive the pinhole collimator and the parallel multihole collimator to move.

16. The diffraction analysis device for the full-field X-ray fluorescence imaging analysis according to claim 15, wherein an aperture size range of the pinhole collimator is 0.1 mm-2 mm, and a material of the pinhole collimator is one of tungsten or lead; an aperture size range of the parallel multihole collimator is 0.5 mm-4 mm, and a material of the parallel multihole collimator is one of tungsten or lead.

\* \* \* \* \*